3,591,612
NOVEL CARBONATES
André Allais, Les Lilas, France, assignor to
Roussel-UCLAF, Paris, France
No Drawing. Filed Apr. 15, 1969, Ser. No. 816,386
Claims priority, application France, Apr. 22, 1968,
148,895
Int. Cl. C07c 169/32
U.S. Cl. 260—397.45                      5 Claims

ABSTRACT OF THE DISCLOSURE

Mixed carbonates of 9α-fluoro-16α-methyl-17α-R-$\Delta^{1,4}$-pregnadiene-11β-21-diol-3,20-dione of the formula

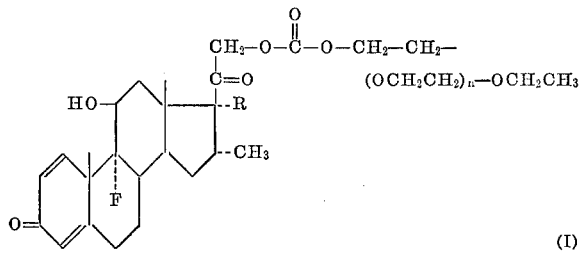

wherein $n$ is an integer from 0 to 10 and R is selected from the group consisting of hydrogen and hydroxyl having anti-inflammatory activity and their preparation.

OBJECTS OF THE INVENTION

It is an object of this invention to provide the novel mixed carbonates of Formula I.

It is another object of the invention to provide a novel process for the preparation of the compounds of Formula I.

It is a further object of the invention to provide novel anti-inflammatory compositions.

It is an additional object of the invention to provide a novel method of treating inflammation in warm-blooded animals.

These and other objects and advantages of the invention will become obvious from the following detailed description.

THE INVENTION

The novel products of the invention are mixed carbonates of poly β-ethoxyethyl and 9α-fluoro-16α-methyl-17α-R-$\Delta^{1,4}$-pregnadiene-11β,21-diol-3,20-dione of the formula

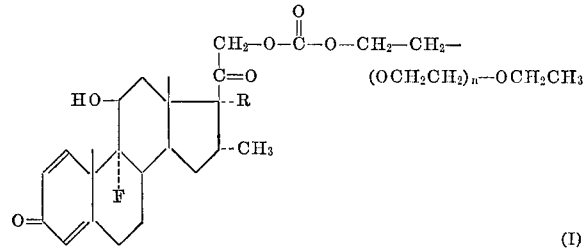

Particularly interesting are the mixed carbonates of (a) β'-ethoxy-β-ethoxyethyl and dexamethasone, (b) β"-ethoxy-β'-ethoxy-β-ethoxyethyl and dexamethasone, (c) β-ethoxyethyl and dexamethasone and (d) β-ethoxyethyl and 9α - fluoro-16α-methyl-$\Delta^{1,4}$-pregnadiene-11β,21-diol-3,20-dione.

The novel process of the invention for the preparation of the novel mixed carbonates of Formula I comprises condensing a chloroformate of the formula.

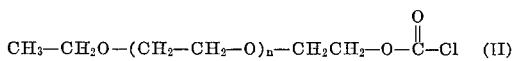

wherein $n$ has the above definition with a steroid of the formula

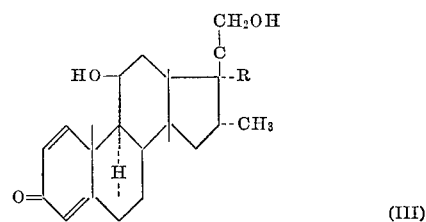

wherein R has the above definition in an organic solvent such as dioxane in the presence of a tertiary base such as pyridine.

The novel anti-inflammatory compositions are comprised of an effective amount of at least one mixed carbonate of Formula I and a major amount of a pharmaceutical carrier. The compositions may be in the form of injectable solutions or suspensions in the form of ampules or multiple dose flacons, sterile powders for extemporaneous use, suppositories, ointments, creams, collyrium, nose and ear drops, topical pulverized powders, solid or liquid aerosol sprays in pressurized containers, ovules and vaginal creams.

The compositions have an important anti-inflammatory activity and are particularly useful for the treatment of local inflammatory or pruriginous manifestations. They are useful for the treatment of radicular algias, acute or chronic polyarthritis, acute of chronic rheumatic complaints and lumbar sciaticas. Due to their ether/water distribution coefficient and their ether/water solubility ratio, they are particularly suitable for topical application.

The novel method of treating inflammation in warm-blooded animals comprises administering to warm-blooded animals an effective amount of at least one carbonate of Formula I. The said carbonates may be administered transcutaneously, rectally or topically to local skin areas or mucous membranes. The preferred concentration of the active compound is 0.01% to 1%.

In the following examples there are described several preferred embodiments to illustrate the invention. However, it should be understood that the invention is not intended to be limited to the specific embodiments.

EXAMPLE I

Mixed carbonate of β'-ethoxy-β-ethoxyethyl and dexamethasone 5 gm. of dexamethasone were added to a mixture of 10 cc. of pyridine and 25 cc. of dioxane and after cooling to 0° C., a solution of 2.9 gm. of β'-ethoxy-β-ethoxyethyl chloroformate in 15 cc. of dioxane was added thereto. The mixture was stirred at 0° C. for 30 minutes and overnight at room temperature. Excess β'-ethoxy-β-ethoxyethyl chloroformate was destroyed by the addition of a few drops of water and then the reaction mixture was poured into a mixture of ice-water and hydrochloric acid. The mixture was extracted with methylene chloride and the organic phase was washed with water until the wash waters were neutral, dried over sodium sulfate and evaporated to dryness in vacuo. The 6.7 gm. of crude residue was recrystallized from hot and cold methanol to obtain 5.4 gm. (76.5% yield) of the mixed carbonate of $\beta'$-ethoxy-$\beta$-ethoxyethyl and dexamethasone having a melting point of 123–125° C. and specific rotation $[\alpha]_D^{20} = +79° \pm 2$ (c.=0.5% in dioxane). The product was soluble in acetone, benzene and chloroform, slightly soluble in alcohol and ether and insoluble in water.

*Analysis.*—Calculated for $C_{29}H_{41}FO_9$ (molecular weight=552.62), (percent): C, 63.02; H, 7.48; F, 3.44. Found (percent): C, 63.1; H, 7.8; F, 3.6.

As far as is known, this compound is not described in the literature.

$\beta'$-Ethoxy-$\beta$-ethoxyethyl chloroformate was prepared by the process of Macko, Chem. Zvesté, vol. 13 (1959), p. 436.

EXAMPLE II

Mixed carbonate of $\beta$-ethoxyethyl and dexamethasone

Using the process of Example I, 5 gm. of dexamethasone and 2.92 gm. of $\beta$-ethoxyethyl chloroformate were reacted to obtain 6.22 gm. of the mixed carbonate of $\beta$-ethoxyethyl and dexamethasone having a melting point of 218° C. and a specific rotation $[\alpha]_D^{20} = +82 \pm 2.5$ (c.= 0.5% in dioxane).

The product was soluble in chloroform, slightly soluble in alcohol, benzene and ether, fairly soluble in acetone and insoluble in water.

*Analysis.*—Calculated for $C_{27}H_{37}FO_8$ (molecular weight=508.57), (percent): C, 63.76; H, 7.33; F, 3.74. Found (percent): C, 64.1; H, 7.5; F, 3.7.

As far as is known, this compound is not described in the literature.

$\beta$-Ethoxyethyl chloroformate was prepared by the process of Ashburn, J. Am. Soc., vol. 60 (1938), p. 2933.

EXAMPLE III

Mixed carbonate of $\beta$-ethoxyethyl and 9$\alpha$-fluoro-16$\alpha$-methyl-$\Delta^{1,4}$-pregnadiene-11$\beta$,21-diol-3,20-dione Using the process of Example I, 2 gm. of 9$\alpha$-fluoro-16$\alpha$-methyl-$\Delta^{1,4}$-pregnadiene-11$\beta$,21-diol-3,20 - dione and 1.21 gm. of $\beta$-ethoxyethyl chloroformate were reacted to obtain 2.6 gm. of the mixed carbonate of $\beta$-ethoxyethyl and 9$\alpha$-fluoro-16$\alpha$-methyl - $\Delta^{1,4}$ - pregnadiene-11$\beta$,21-diol-3,20-dione having a melting point of 130° C. and a specific rotation $[\alpha]_D^{20} = +113.5° \pm 2°$ (c.=1.05% in chloroform).

The product was soluble in alcohol, acetone and chloroform, fairly soluble in ether, slightly soluble in benzene and insoluble in water.

*Analysis.*—Calculated for $C_{27}H_{37}FO_7$ (molecular weight=492.56) (percent): C, 65.83; H, 7.57; F, 3.86. Found (percent): C, 65.8; H, 7.7; F, 4.0.

As far as is known, this compound is not described in the literature.

EXAMPLE IV

Mixed carbonate of $\beta''$-ethoxy-$\beta'$-ethoxy-$\beta$-ethoxyethyl and dexamethasone Step A: $\beta''$-ethoxy-$\beta'$-ethoxy-$\beta$-ethoxyethyl chloroformate.—30 cc. of toluene were added to 72.5 cc. of a 31% solution of phosgene in toluene with stirring under nitrogen and at room temperature and after the addition of 17.8 gm. of triethylene glycol monoethylether in 60 cc. of benzene, the reaction mixture was stirred at room temperature for 18 hours. Excess phosgene and the hydrochloric acid formed were removed by a current of nitrogen and the benzene and toluene were evaporated off. The residue was distilled to obtain 16 gm. of $\beta''$-ethoxy-$\beta'$-ethoxy-$\beta$-ethoxyethyl chloroformate as a colorless liquid boiling at 106–109° C. at 0.9–1.1 mm. Hg.

Step B: Mixed carbonate.—2 gm. of dexamethasone were suspended in 4 cc. of pyridine and 10 cc. of dioxane at an internal temperature of 0 to 2° C. under a nitrogen atmosphere and after the addition of a solution of 1.85 gm. of $\beta''$-ethoxy-$\beta'$-ethoxy-$\beta$-ethoxyethyl chloroformate in 6 cc. of dioxane, the reaction temperature was raised to 20° C. and the mixture was stirred for 18 hours still under a nitrogen atmosphere. Excess chloroformate was destroyed by the addition of a few drops of water and the reaction mixture was poured into a solution of 4.8 cc. of hydrochloric acid in 40 cc. of water. After decanting off the liquid, the precipitate was dissolved in ether and the ether phase was washed with water and distilled to dryness. The residue was dissolved in 1 cc. of hot ethanol to which isopropyl ether was added at 60° C. to begin precipitation. After ice cooling, the mixture was vacuum filtered. The precipitate was washed with an iced mixture of ethanol/isopropyl ether and dried to obtain 2.345 gm. of mixed carbonate of $\beta''$-ethoxy-$\beta'$-ethoxy-$\beta$-ethoxyethyl and dexamethasone melting at 89° C. Letting the decanted mother liquid stand gave an additional 0.405 gm. of product melting at 90° C. for a total yield of 89%. Recrystallization of the product from ethanol-isopropyl ether gave a product melting at 89.5° C. and a specific rotation $[\alpha]_D^{20} = +83°$ (c.=0.5% in ethanol). The product was soluble in alcohol, ether and chlorinated solvents and insoluble in water.

*Analysis.*—Calculated for $C_{31}H_{45}O_{10}F$ (molecular weight=596.69) (percent): C, 62.39; H, 7.60; F, 3.18. Found (percent): C, 62.3; H, 7.9; F, 3.4.

U.V. spectrum (ethanol):
$\lambda$ max at 239–240 m$\mu$ $\epsilon$=16,000

I.R. spectrum (chloroform):
Presence of —OH
Presence of $\Delta^{1,4}$-3-one
Presence of carbonyl at 1,751 cm.$^{-1}$ and 1,732 cm.$^{-1}$ As far as is known, this product is not described in the literature.

EXAMPLE V 0.25 g. of the active product was added to 10 gm. of propylene glycol, 37 gm. of polyoxyethylene glycol 3000, 11 gm. of polyoxyethylene glycol 4000 and sufficient polyoxyethylene 1,540 to make a total of 100 gm.

The dosage of active ingredient is expressed in molecular equivalent of the corresponding free alcohol.

PHARMACOLOGICAL DATA (A) Anti-inflammatory activity

The subcutaneous anti-inflammatory activity of the carbonates of Formula I was determined with the granuloma test with cotton using the technique of Singer, Proceed. Soc. Exp. Biol. Med., vol. 92 (1956), p. 23 as modified by Arth, J.A.C.S., vol. 80 (1958), p. 3161. Female rats weighing 100 to 120 gm. received a ventral bilateral subcutaneous implantation of a coton pellet weighing about 10 mg. The test products were then administered subcutaneously morning and evening for 2 consecutive days with the first immediately following the implantation. On the 3rd day, 17 hours after the last administration, the rats were sacrificed and the pellets with the granuloma tissue which encircled them were cut out and weighed. The dry granuloma weight was determined by subtracting the weight of the cotton and the weights of the granuloma of the pellet impregnated with the product under study were expressed as a percentage of the weight of the granuloma of the control pellets. The thymus gland was also removed and weighed to determine the thymolytic activity. The products were administered in aqueous suspension and were compared to dexamethasone or dexamethasone acetate. The controls received only the aqueous suspension. The results are reported in Table I.

TABLE I

| Product | Doses in γ/kg. | Dried granuloma | | Thymus | |
|---|---|---|---|---|---|
| | | Weight in mg. | Percent protection | Weight in mg. | Percent involution |
| Controls | 0 | 48.9 | | 272 | |
| Mixed carbonate of β'-ethoxy-β-ethoxyethyl and dexamethasone | 70.5 | 26.1 | 46 | 147 | 46 |
| Dexamethasone | 50 | 29.9 | 39 | 117 | 57 |
| Mixed carbonate of β'-ethoxy-β-ethoxyethyl and dexamethasone | 141 | 17.5 | 64 | 86 | 69 |
| Dexamethasone | 100 | 17.9 | 63 | 97 | 64 |
| Controls | 0 | 67.5 | | 299 | |
| Mixed carbonate of β''-ethoxy-β'-ethoxy-β-ethoxyethyl and dexamethasone | 76 | 46.1 | 32 | 141 | 53 |
| Dexamethasone acetate | 55 | 47.2 | 30 | 136 | 55 |

The results of Table I show that the thymolytic and the anti-inflammatory activity of the mixed carbonate of β''-ethoxy-β'-ethoxy-β-ethoxyethyl and dexamethasone is equal to dexamethasone acetate and that the thymolytic and the anti-inflammatory activity of the mixed carbonate of β'-ethoxy β-ethoxyethyl and dexamethasone is equal to dexamethasone.

(B) Transcutaneous action on rats determined by the thymolytic effect

The thymolytic effect in the rat was determined after cutaneous applications of β'-ethoxy-β-ethoxyethyl and dexamethasone mixed carbonate in comparison with dexamethasone acetate, both products being administered in the form of a 0.25% ointment (concentration expressed in dexamethasone).

Male rats weighing 160–170 gm. each were depilated in the cervical region under anesthesia with ether on the day prior to the experiment. They received two applications per day of the ointment containing the said compound for 2 days, the ointment being applied by massaging the depilated area with the ointment for about 30 seconds. The rats were sacrificed on the third day and the thymus glands were removed and weighed.

This treatment corresponded with the administration of 45μg. of active compound per kg. of body weight per application (dose expressed in dexamethasone). A decrease in weight of the thymus glands of about 50% was ascertained by comparison with the weight of the thymus glands as determined in the control rats. The results showed satisfactory cutaneous penetration of the said product.

(C) Solubility of the products of the invention in ether and water

The determinant importance of solubility ratios for transcutaneous penetration has frequently been emphasized. Recently, the solubility properties of several cortisone compounds were studied by Katz et al., J. Pharm. Sci., 1965, 54, 581 and a probant correlation was made evident as to the percutaneous activity in human and the product between the ether/water partition coefficient and the aqueous solubility.

The separated solubility of the products under investigation in ether then in water was determined. The quantities of dissolved product were dosed by spectrophotometry upon saturation under standard conditions. The results are given in Table II.

TABLE II

| Products | Solubility in mg./liter | | Ratio ether/water |
|---|---|---|---|
| | Ether | Water | |
| Mixed carbonate of β-ethoxyethyl and dexamethasone | 604 | 5 | 116 |
| Mixed carbonate of β'-ethoxy-β-ethoxyethyl and dexamethasone | 2,280 | 102 | 22 |
| Mixed carbonate of β''-ethoxy-β'-ethoxy-β-ethoxyethyl and dexamethasone | 6,400 | 26 | 246 |
| Mixed carbonate of β-ethoxyethyl and 9α-fluoro-16α-methyl-Δ1,4-pregnadiene-11β,21-diol-3,20-dione | 4,455 | 28 | 159 |
| Dexamethasone acetate | 476 | 17 | 27 |

Various modifications of the compositions and method of the invention may be made without departing from the spirit or scope thereof.

We claim:
1. A mixed carbonate of the formula

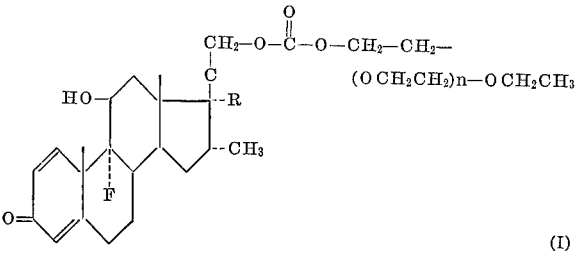

(I)

wherein n is an integer from 0 to 10 and R is selected from the group consisting of hydrogen and hydroxyl.

2. A compound of claim 1 wherein R is hydroxyl and n is 1.

3. A compound of claim 1 wherein R is hydroxyl and n is 0.

4. A compound of claim 1 wherein R is hydroxyl and n is 2.

5. A compound of claim 1 wherein R is hydrogen and n is 0.

References Cited

FOREIGN PATENTS 1,087,730   10/1967   Great Britain _____ 260—397.45

ELBERT L. ROBERTS, Primary Examiner

U.S. Cl. X.R.

424—243

UNITED STATES PATENT OFFICE

CERTIFICATE OF CORRECTION

Patent No. 3,591,612     Dated July 6, 1971

Inventor: André Allais

It is certified that error appears in the above identified patent and that said Letters Patent are hereby corrected as shown below:

Column 2, formula III should read as follows:

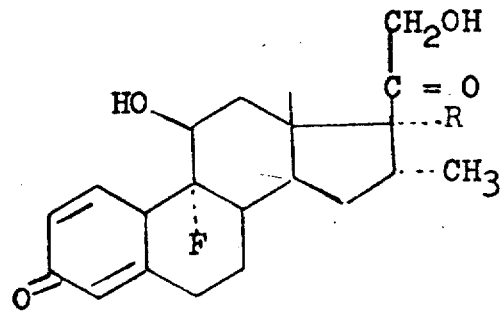

Column 3, line 30     After "82" insert degree sign

Column 4, line 59     Correct spelling of "cotton"

Column 6, claim 1, Formula should read:

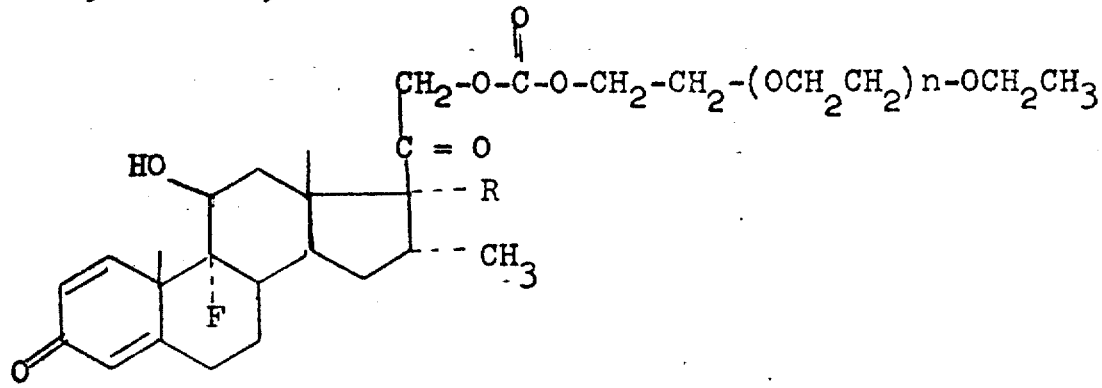

Signed and sealed this 15th day of February 1972.

(SEAL)
Attest:

EDWARD M. FLETCHER, JR.
Attesting Officer

ROBERT GOTTSCHALK
Commissioner of Patents